(12) United States Patent
Nakamura

(10) Patent No.: US 9,534,796 B2
(45) Date of Patent: Jan. 3, 2017

(54) AIRFLOW DIRECTION CONTROL OF INDOOR UNIT OF AIR-CONDITIONING APPARATUS

(75) Inventor: Toshinori Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 716 days.

(21) Appl. No.: 13/592,399

(22) Filed: Aug. 23, 2012

(65) Prior Publication Data

US 2013/0153173 A1  Jun. 20, 2013

(30) Foreign Application Priority Data

Dec. 20, 2011 (JP) .................................. 2011-278959

(51) Int. Cl.
| | |
|---|---|
| F28F 27/00 | (2006.01) |
| F24F 1/00 | (2011.01) |
| F24F 13/15 | (2006.01) |
| F24F 11/00 | (2006.01) |

(52) U.S. Cl.
CPC ............ *F24F 1/0007* (2013.01); *F24F 1/0033* (2013.01); *F24F 11/0079* (2013.01); *F24F 13/15* (2013.01); *F24F 1/0029* (2013.01); *Y02B 30/746* (2013.01)

(58) Field of Classification Search
CPC ...... F24F 1/0007; F24F 1/0011; F24F 1/0033; F24F 9/00; F24F 11/0078; F24F 11/0079; F24F 11/025; F24F 13/081; F24F 13/10; F24F 13/14; F24F 13/1413; F24F 13/15; F24F 13/24; F24F 1/0029

USPC ......................................................... 165/200
See application file for complete search history.

(56) References Cited

U.S. PATENT DOCUMENTS

| | | | | |
|---|---|---|---|---|
| 3,403,725 | A | * | 10/1968 | Miner ................... F24F 1/0007 165/122 |
| 5,660,588 | A | * | 8/1997 | Kotoh et al. ................... 454/285 |
| 2003/0167786 | A1 | * | 9/2003 | Nakagawa et al. ............. 62/285 |
| 2009/0107167 | A1 | * | 4/2009 | Kim et al. ....................... 62/426 |

FOREIGN PATENT DOCUMENTS

| | | |
|---|---|---|
| JP | 62-147259 A | 7/1987 |
| JP | A-2008-175431 | 7/2008 |

OTHER PUBLICATIONS

Office Action dated Dec. 15, 2014 issued in corresponding CN patent application No. 201210347104.0 (and English translation).

* cited by examiner

*Primary Examiner* — Travis Ruby
(74) *Attorney, Agent, or Firm* — Posz Law Group, PLC

(57) ABSTRACT

An indoor unit of an air-conditioning apparatus includes a plurality of blower fans provided adjacent to each other in a left-right direction, a heat exchanger, and a plurality of vertical vanes that are provided in an air outlet and that deflect an airflow to be blown out from the air outlet in a left/right direction. Further, when the airflow to be blown out from the air outlet is deflected in at least one direction in the left/right direction, the air volume of the blower fan disposed on the leftmost side or the rightmost side of the vertical vanes corresponding to the deflection direction is reduced relative to the air volume of the other blower fan.

11 Claims, 11 Drawing Sheets

AIRFLOW DIRECTION CONTROL OF INDOOR UNIT OF AIR-CONDITIONING APPARATUS

TECHNICAL FIELD

The present invention is related to an indoor unit of an air-conditioning apparatus that includes a plurality of vertical vanes that deflects airflow to be blown out from an air outlet in a left/right direction.

BACKGROUND ART

Hitherto, an indoor unit of an air-conditioning apparatus has been proposed in which a plurality of vertical vanes that deflects airflow to be blown out from an air outlet in a left/right direction are provided in the air outlet. In this kind of conventional indoor unit, when the airflow to be blown out from the air outlet is deflected with the vertical vanes in the left/right direction, conditioned air is not blown out to the desired direction at the side end portion of the air outlet on the deflection side, thus a problem that the left/right airflow angle of the air outlet cannot be widened is encountered. For example, when the airflow to be blown out from the air outlet is deflected to the left with the vertical vanes and when the vertical vane increases the deflection angle, the air that has been deflected by one or more vertical vanes near the left end side of the air outlet impinges on the left sidewall of the indoor unit; hence, the direction of the air is disadvantageously altered to the front direction.

Further, depending on the positioning and spacing of each of the vertical vanes, the rate of airflow impinging on the sidewall of the indoor unit increases; hence, a case in which the general direction of the airflow blown out from the air outlet is directed to an unexpected direction has been created.

Accordingly, in order to widen the left/right airflow angle of the air outlet, a known indoor unit of an air-conditioning apparatus is proposed in which the indoor unit of the air-conditioning apparatus is "provided with an air outlet 7 formed between a stabilizer 4 and a rear guider 5 and with rotatable left/right wind direction changing blades 6 that changes a left/right direction of air blown out from the air outlet 7, in which the entire left/right wind direction changing blades 6 are disposed outside the air outlet 7 such that the indoor unit is capable of controlling the air direction with the left/right wind direction changing blades 6 at a location nearer to the user, leading to improved comfort. Unlike conventional cases in which the left/right wind direction changing blades 6 are mounted inside the air outlet 7, since there is not side walls 1b at both ends of the left/right wind direction changing blades 6, it is possible to obtain a wide discharge angle of the blown out air" (see Patent Literature 1).

CITATION LIST

Patent Literature

[Patent Literature 1] Japanese Unexamined Patent Application Publication No. 2008-175431 (Abstract, FIG. 1)

SUMMARY OF INVENTION

Technical Problem

However, since the indoor unit of the air-conditioning apparatus disclosed in Patent Literature 1 protrudes the vertical vanes (left/right wind direction changing blades 6 of Patent Literature 1) outside the air outlet during operation, the vertical vanes are likely to be in contact with a hand of a user; hence, the vertical vanes are disadvantageously moved to an unexpected angle.

Further, since the indoor unit of the air-conditioning apparatus disclosed in Patent Literature 1 protrudes the vertical vanes (left/right wind direction changing blades 6 of Patent Literature 1) outside the air outlet during operation, the design is disadvantageously degraded.

The invention is made to overcome the above disadvantages and an object thereof is to obtain an indoor unit of an air-conditioning apparatus that is capable of widening a left/right airflow angle of an air outlet while preventing vertical vanes from being easily in contact with a hand of a user and design from being degraded.

Solution to Problem

An indoor unit of an air-conditioning apparatus according to the invention includes a casing being formed with an air inlet in an upper portion of the casing and with an air outlet on a lower front side of the casing; a plurality of blower fans, including a propeller type or a mixed flow type, being provided on a downstream side of the air inlet so as to be adjacent to each other along a left-right direction of the casing; a heat exchanger being provided on a downstream side of the blower fans and on an upstream side of the air outlet, the heat exchanger exchanging heat between air that has been blown out from the blower fans and a refrigerant; and a plurality of vertical vanes being oscillatably provided in the air outlet in the left-right direction, the vertical vanes deflecting airflow to be blown out from the air outlet in a left/right direction, in which at time of deflecting the airflow to be blown out from the air outlet with the vertical vanes in at least one direction in the left/right direction, an air volume of a blower fan of the blower fans disposed on a leftmost side or a rightmost side of the vertical vanes corresponding to the deflection direction is reduced relative to an air volume of a blower fan other than the blower fan disposed on the leftmost side or a rightmost side.

Advantageous Effects of Invention

In the invention, the airflow near the side end portion of the air outlet on the deflection side is smaller relative to the airflow flowing in other portions of the air outlet. Accordingly, when the airflow near the side end portion of the air outlet on the deflection side merges with the airflow flowing in the other portions, a directional component that alters the merged airflow towards the front direction is suppressed. Thus, the general direction (the air direction) of the airflow that is blown out from the air outlet can be approximated to the desired direction, and the left/right airflow angle of the air outlet can be made larger than conventional ones. In the present invention, since the vertical vanes do not protrude out from the air outlet, the vertical vanes being easily in contact with the hand of the user and the degradation of the design can be prevented.

DESCRIPTION OF EMBODIMENTS

Embodiment 1

Figure 1:
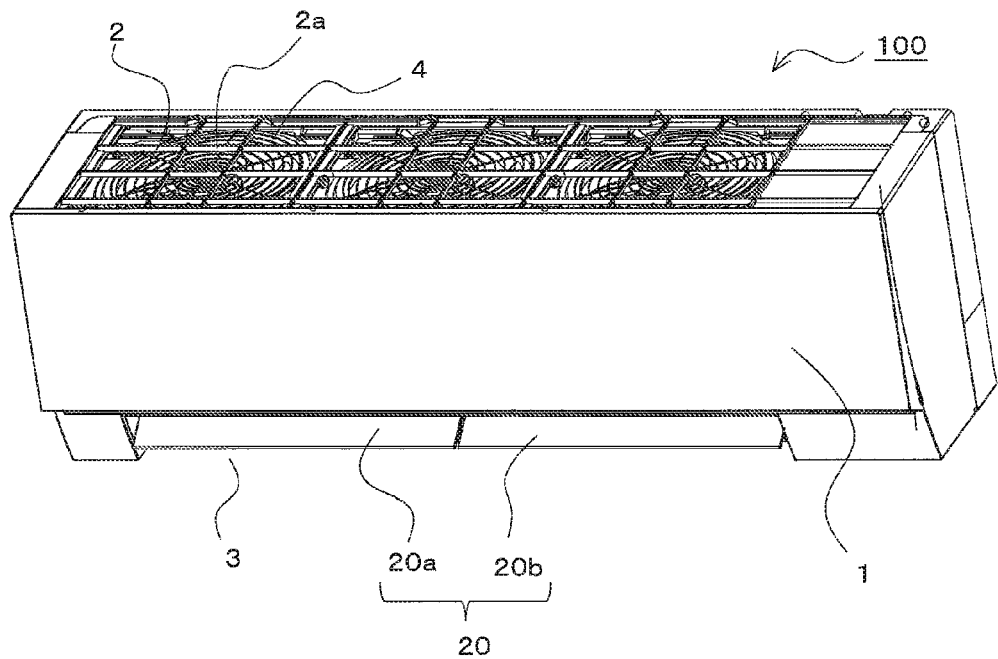
FIG. 1 is a perspective view of an indoor unit of an air-conditioning apparatus according to Embodiment 1 of the invention viewed from a front upper right direction.
Figure 2:
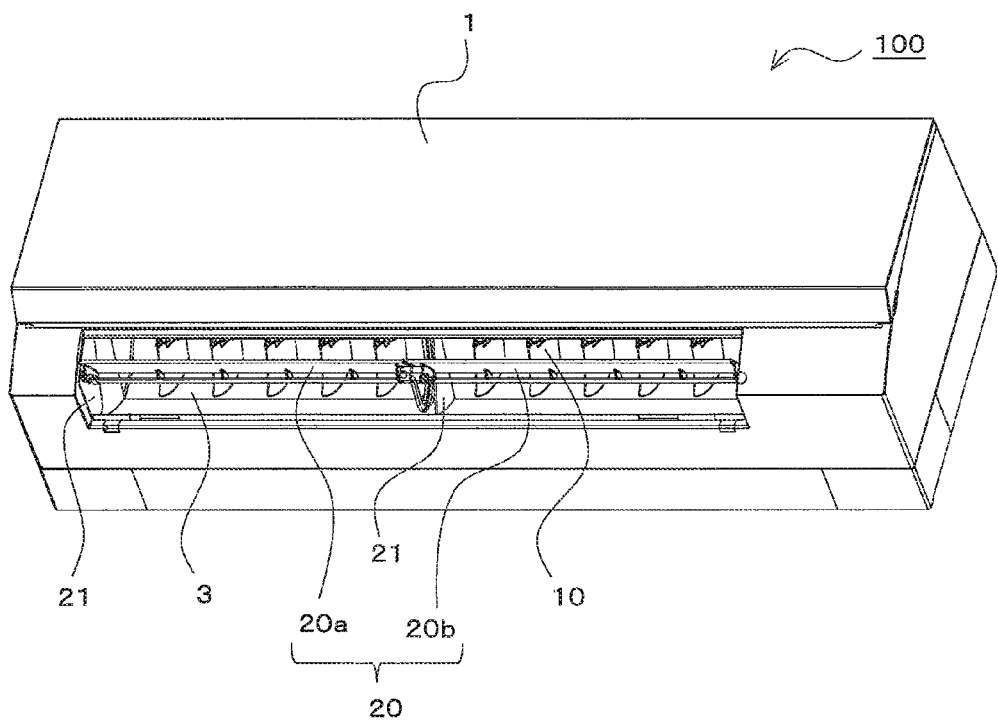
FIG. 2 is a perspective view of the indoor unit of the air-conditioning apparatus according to Embodiment 1 of the invention viewed from a front lower right direction.
Figure 3:
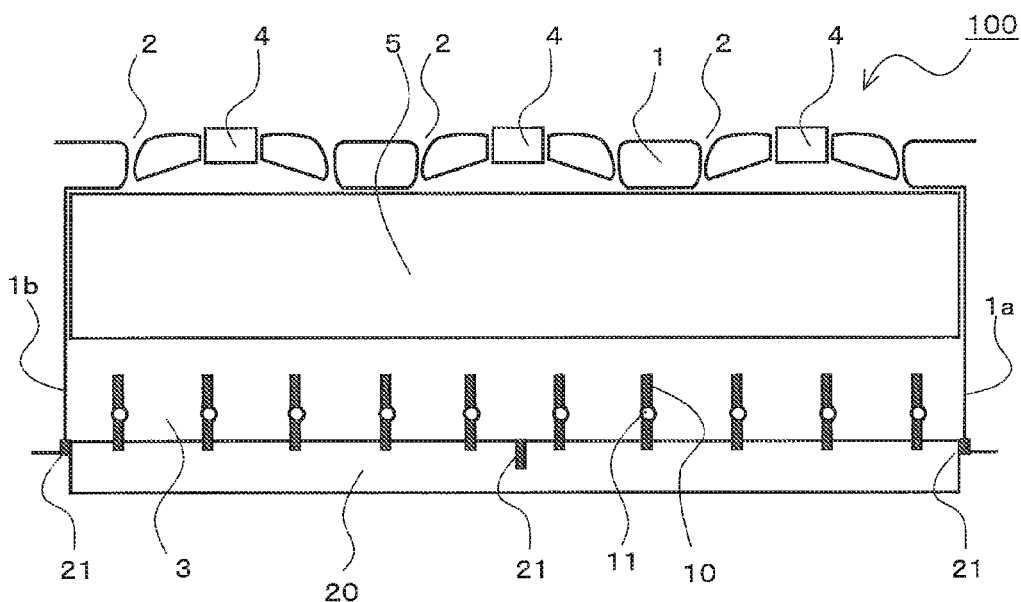
FIG. 3 is a front cross-sectional view (a cross-section taken along an imaginary section in a left-right direction) of the indoor unit of the air-conditioning apparatus according to Embodiment 1 of the invention.
Figure 4:
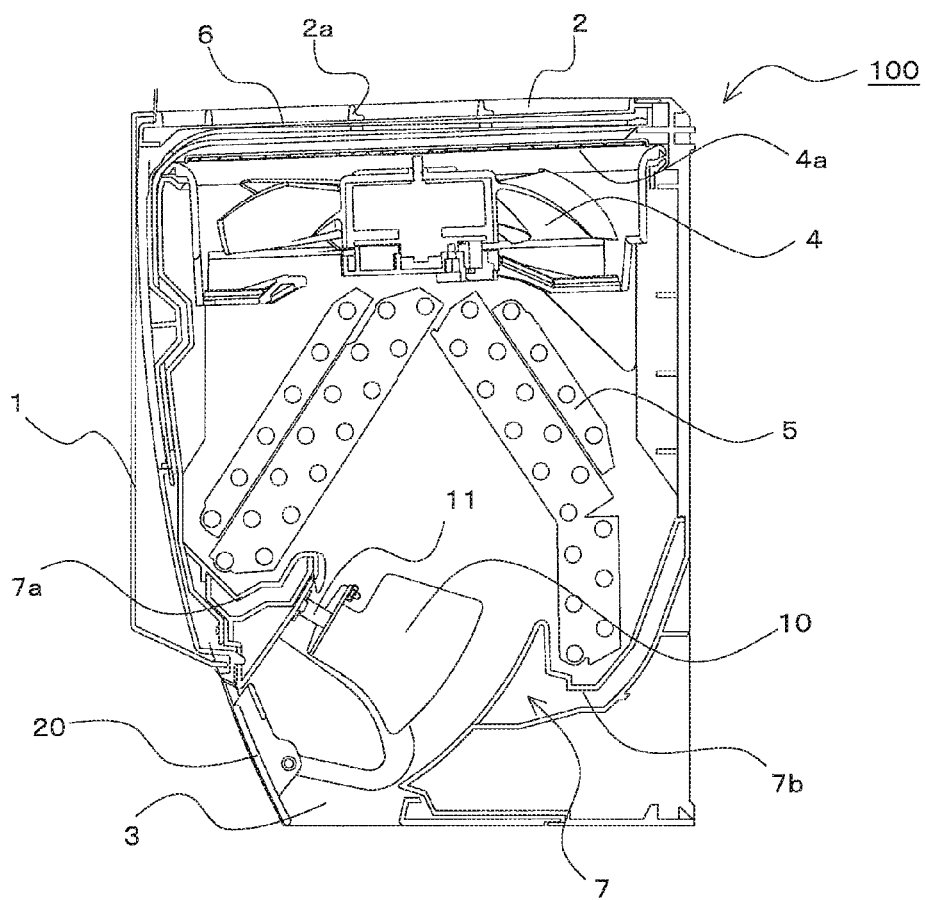
FIG. 4 is a side cross-sectional view (a cross-section taken along an imaginary section in a front-back direction) of the indoor unit of the air-conditioning apparatus according to Embodiment 1 of the invention.

FIG. 1 is a perspective view of an indoor unit of an air-conditioning apparatus according to Embodiment 1 of the invention viewed from a front upper right direction. FIG. 2 is a perspective view of the indoor unit of the air-conditioning apparatus viewed from a front lower right direction. FIG. 3 is a front cross-sectional view (a cross-section taken along an imaginary section in a left-right direction) of the indoor unit of the air-conditioning apparatus. Further, FIG. 4 is a side cross-sectional view (a cross-section taken along an imaginary section in a front-back direction) of the indoor unit of the air-conditioning apparatus. Description of an indoor unit 100 of the air-conditioning apparatus according to Embodiment 1 will be subsequently described with reference to FIGS. 1 to 4. Note that in each of the subsequent diagrams, the dimensions, shapes, and the like of the constituents may be different among the diagrams and some constituents may be not shown in the diagram in order to facilitate understanding of the indoor unit 100 according to Embodiment 1.

The indoor unit 100 includes a casing 1 that is formed with air inlets 2 in its upper portion and an air outlet 3 formed in its lower front side. Further, the casing 1 includes therein a plurality of blower fans 4 provided with a fan guard 4a on the upstream side, a heat exchanger 5 that exchanges heat between air suctioned into the casing 1 and a refrigerant, and the like.

Specifically, blower fans 4 are provided on the downstream side of the air inlets 2 so as to be adjacent to each other along the left-right direction of the casing 1. In Embodiment 1, three blower fans 4 are provided adjacent to each other. Further, the casing 1 is provided with three air inlets 2 adjacent to each other in positions corresponding to the blower fans 4. Each of the inlet ports 2 is, for example, of a substantially rectangular shape formed with, for example, lattice bars 2a therein. The indoor unit 100 according to Embodiment 1 is further provided with a filter 6, which removes dust and the like from indoor air flowing into the casing 1, between the air inlets 2 and the blower fans 4. Note that in Embodiment 1, propeller fans that are axial fans are employed as the blower fans 4. Not limited to the axial fans, mixed flow fans may be employed as the blower fans 4.

The heat exchanger 5 is provided on the downstream side of the blower fans 4 and on the upstream side of the air outlet 3. This heat exchanger 5 has, for example, a substantially inverted V-shape in a cross sectional view and are provided below with a drain pan 7 that drains drain condensed on the heat exchanger 5 to the outside of the indoor unit 100. The drain pan 7 includes a front side drain pan 7a disposed below the front lower end of the heat exchanger 5 and includes a rear side drain pan 7b disposed below the rear lower end of the heat exchanger 5. The front side drain pan 7a and the rear side drain pan 7b are integrally formed and form therebetween a nozzle portion that communicates with the air outlet 3.

The indoor unit 100 according to the Embodiment 1 is further provided in the air outlet 3 with vertical vanes 10 and a horizontal vane 20 that deflect the airflow that is to be blown out from the air outlet 3. The vertical vanes 10 are tabular components that horizontally deflect the airflow that is to be blown out from the air outlet 3. A plurality of vertical vanes 10 are provided adjacent to each other along the left-right direction in the air outlet 3. Each of these vertical vanes 10 is supported so as to be oscillatable in the left/right direction with the support shaft 11 that is protrudingly provided on an upper side of the nozzle (specifically, a rear portion of the front side drain pan 7a). Further, each vertical vane 10 is connected with a connecting rod. That is, it is structured such that by moving the connecting rod in the left-right direction with a drive unit (not shown), each vertical vane 10 is oscillated in the left/right direction with the support shaft 11 as its pivotal center, thus allowing the airflow, which is blown out from the air outlet 3, to be deflected in the left/right direction.

The horizontal vane 20 deflects the airflow that is to be blown out from the air outlet 3 in the up/down direction and is a tabular component that extends along the left-right direction of the air outlet 3. This horizontal vane 20 is supported so as to be oscillatable in the up/down direction with support units 21 that are each provided at the opposite side end portions of the air outlet 3. The horizontal vane 20 is further supported so as to be oscillatable in the up/down direction at a midway portion thereof (more specifically, substantially middle portions of the horizontal vane 20 and the air outlet 3) with the support unit 21 in order to prevent noise such as chattering sound from being generated when air is sent out from the air outlet 3. Note that in Embodiment 1, the horizontal vane 20 is constituted by two horizontal vanes (a first horizontal vane 20a and a second horizontal vane 20b) (See FIGS. 1 and 2). The first horizontal vane 20a is supported so as to be oscillatable in the up/down direction with a support unit 21 provided at the left end of the air outlet 3 and a support unit 21 that is provided in the midway portion. The second horizontal vane 20b is supported so as to be oscillatable in the up/down direction with a support unit 21 provided at the right end of the air outlet 3 and a support unit 21 that is provided in the midway portion. That is, it is structured such that by oscillating the horizontal vane 20 in the up/down direction with a driving unit (not shown), the airflow, which is blown out from the air outlet 3, is deflected in the up/down direction. Note that in FIG. 3 and subsequent diagrams, the first horizontal vane 20a and the second horizontal vane 20b are illustrated as an integral unit.

(Description of Operation)

The indoor unit 100 of the air-conditioning apparatus configured as above operates as below.

The rotation of the blower fans 4 draws the indoor air into the casing 1 through the air inlets 2. This indoor air is sent to the heat exchanger 5 after the dust therein is removed by the filter 6. The indoor air that has been sent to the heat exchanger 5 exchanges heat with the refrigerant flowing in the heat exchanger 5 and is blown out from the air outlet 3 as air-conditioned air. At this point, the vertical vanes 10 deflect the airflow that is to be blown out from the air outlet 3 in the left/right direction. Further, the horizontal vane 20 deflects the airflow that is to be blown out from the air outlet 3 in the up/down direction.

Figure 5:
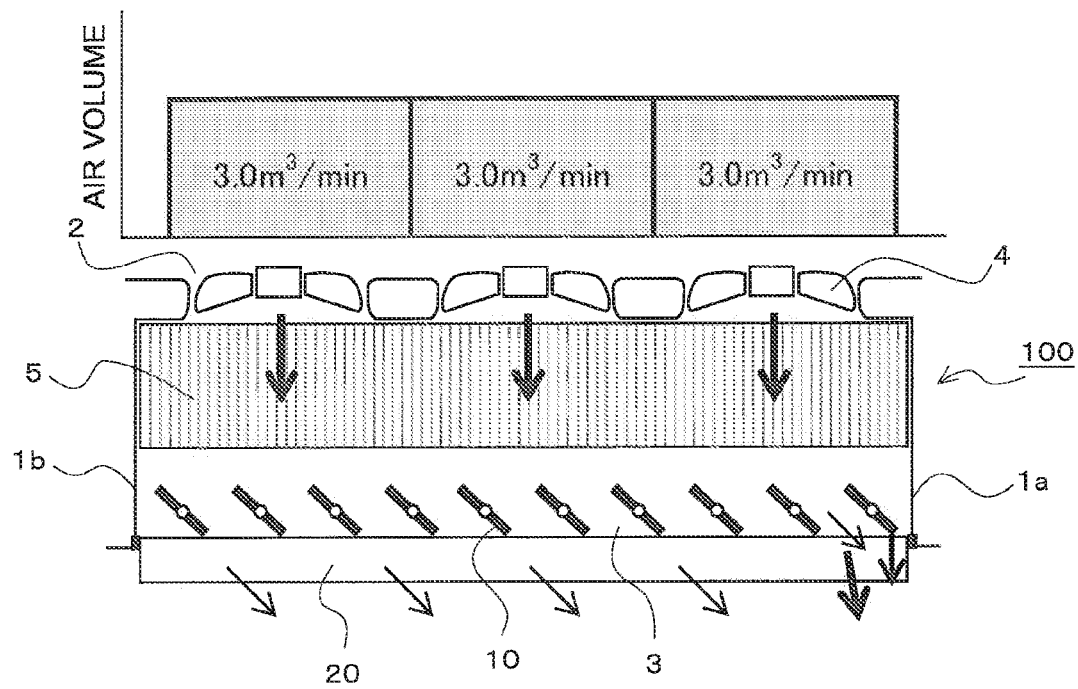
FIG. 5 is an explanatory diagram (front cross-sectional view) illustrating an operation state of the indoor unit of the air-conditioning apparatus according to Embodiment 1 of the invention in which an airflow to be blown out from an air outlet is deflected to the left/right direction, while not changing air volumes of each blower fan.

Herein, a concern illustrated in FIG. 5 arises when the vertical vanes 10 deflect the airflow that is to be blown out from the air outlet 3 in the left/right direction.

FIG. 5 is an explanatory diagram (front cross-sectional view) illustrating an operation state of the indoor unit of the air-conditioning apparatus according to Embodiment 1 of the invention in which an airflow to be blown out from an air outlet is deflected to the left/right direction while the air volumes of each blower fan are not changed. Note that in FIG. 5, a state is illustrated in which the airflow to be blown out from the air outlet 3 is deflected to the right with the vertical vanes 10.

As illustrated in FIG. 5, in the case in which the airflow to be blown out from the air outlet 3 is deflected to the right (blown to the right), when the deflection angle is large, the airflow that has been deflected by one or some vertical vanes 10 disposed near the right end side of the air outlet 3 impinges on the right side wall 1a of the casing 1; hence, the direction of the airflow is disadvantageously altered to the front direction. Further, when the airflow that has been altered to the front direction merges with the other airflow that has been deflected to the right (that is, the airflow that has been deflected to the desired direction), the general direction of the airflow that has been blown out from the air outlet 3 (that is, the air direction) disadvantageously becomes one that is altered to the front direction relative to the desired direction.

Similarly, in the case in which the airflow to be blown out from the air outlet 3 is deflected to the left (blown to the left), when the deflection angle is large, the airflow that has been deflected by one or some vertical vanes 10 disposed near the left end side of the air outlet 3 impinges on the left side wall 1a of the casing 1; hence, the direction of the airflow is disadvantageously altered to the front direction. Further, when the airflow that has been altered to the front direction merges with the other airflow that has been deflected to the left (that is, the airflow that has been deflected to the desired direction), the general direction of the airflow that has been blown out from the air outlet 3 (that is, the air direction) disadvantageously becomes one that is altered to the front direction relative to the desired direction.

Consequently, the left/right airflow angle (the allowed maximum angle of the airflow in the left/right direction) of the air outlet 3 becomes smaller than the desired left/right airflow angle.

Figure 6:
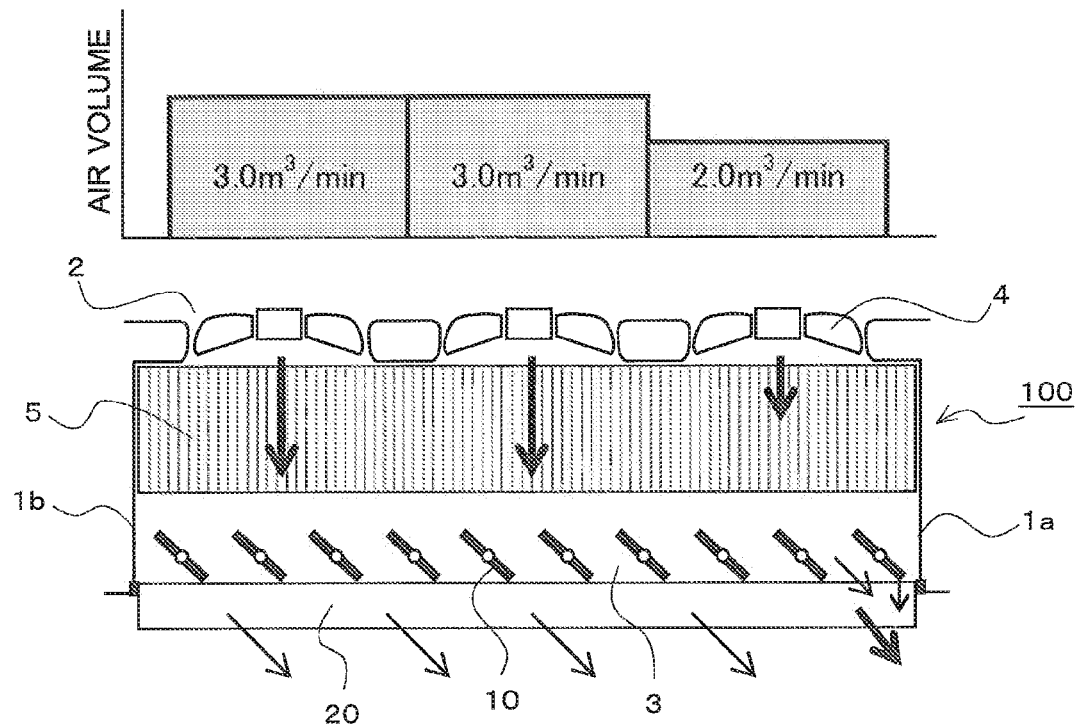
FIG. 6 is an explanatory diagram (front cross-sectional view) illustrating an explanatory operation state of the indoor unit of the air-conditioning apparatus according to Embodiment 1 of the invention in which an airflow to be blown out from an air outlet is deflected to the right.
Figure 7:
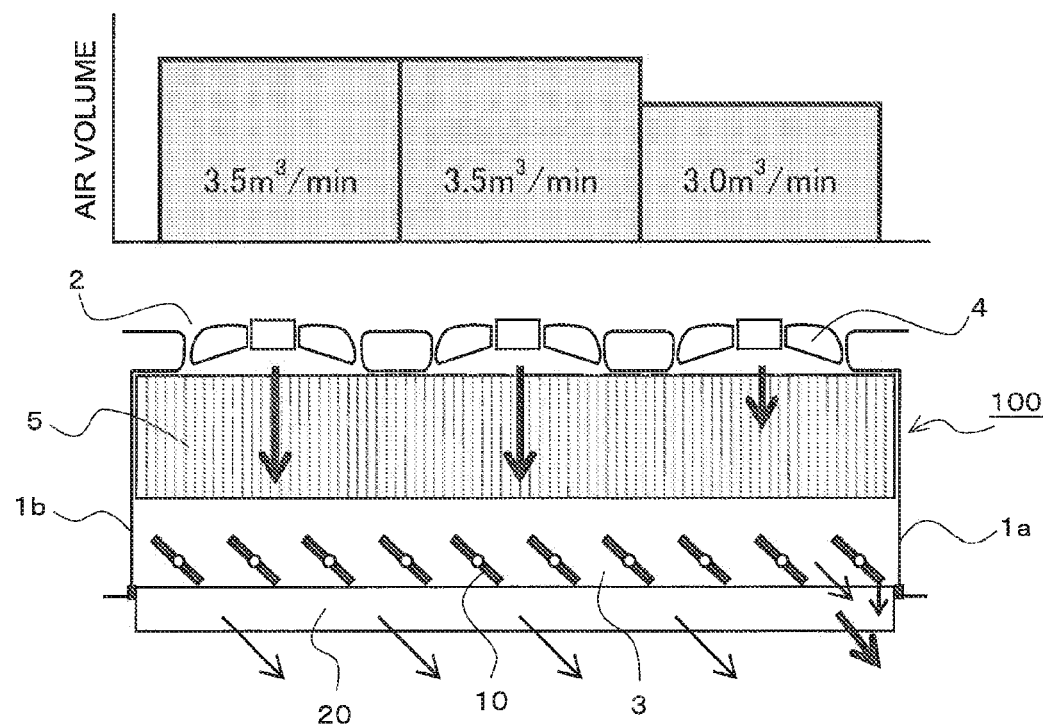
FIG. 7 is an explanatory diagram (front cross-sectional view) illustrating another explanatory operation state of the indoor unit of the air-conditioning apparatus according to Embodiment 1 of the invention in which an airflow to be blown out from an air outlet is deflected to the right.
Figure 8:
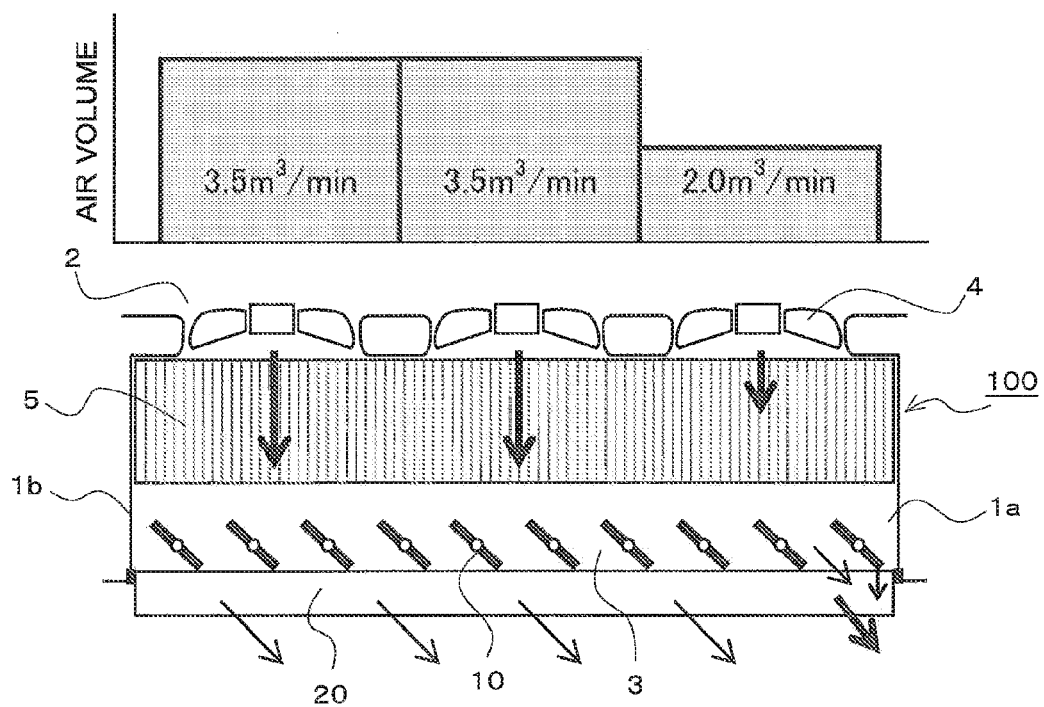
FIG. 8 is an explanatory diagram (front cross-sectional view) illustrating a further explanatory operation state of the indoor unit of the air-conditioning apparatus according to Embodiment 1 of the invention in which an airflow to be blown out from an air outlet is deflected to the right.

Now, in the indoor unit 100 according to Embodiment 1 that is provided with a plurality of blower fans 4 adjacent to each other in the left-right direction, when the airflow that is to be blown out from the air outlet 3 is deflected to the right, the air volume of each of the blower fans 4 is controlled, for example, as illustrated in FIGS. 6 to 8.

FIG. 6 is an explanatory diagram (front cross-sectional view) illustrating an explanatory operation state of the indoor unit of the air-conditioning apparatus according to Embodiment 1 of the invention in which the airflow to be blown out from the air outlet is deflected to the right.

For example, as illustrated in FIG. 6, when the airflow to be blown out from the air outlet 3 is deflected to the right (blown to the right), the air volume of the blower fan 4 disposed in the rightmost position (that is, the blower fan 4 disposed on the rightmost side of the vertical vanes 10 corresponding to the deflection direction) is reduced. Accordingly, the air volume of the airflow, whose direction has been altered to the front direction by being impinged to the right side wall 1a of the casing 1, becomes relatively small compared to the airflow flowing in the other position that has been deflected in the desired direction. Thus, when the airflow that has been altered to the front direction merges with the other airflow that has been deflected to the right (that is, the airflow that has been deflected to the desired direction), the directional component altering the merged airflow to the front direction can be suppressed. Consequently, the direction of the airflow that is blown out from the air outlet 3 can be approximated to the initially desired direction.

FIG. 7 is an explanatory diagram (front cross-sectional view) illustrating another explanatory operation state of the indoor unit of the air-conditioning apparatus according to Embodiment 1 of the invention in which the airflow to be blown out from the air outlet is deflected to the right.

For example, as illustrated in FIG. 7, when the airflow to be blown out from the air outlet 3 is deflected to the right (blown to the right), the air volumes of the blower fans 4 other than the one disposed in the rightmost position (that is, the blower fan 4 disposed on the rightmost side of the vertical vanes 10 corresponding to the deflection direction) are increased. With this operation method as well, the air volume of the airflow, whose direction has been altered to the front direction by being impinged to the right side wall 1a of the casing 1, becomes relatively small compared to the airflow flowing in the other position that has been deflected in the desired direction. Thus, when the airflow that has been altered to the front direction merges with the other airflow that has been deflected to the right (that is, the airflow that has been deflected to the desired direction), the directional component altering the merged airflow to the front direction can be suppressed. Consequently, the direction of the airflow that is blown out from the air outlet 3 can be approximated to the initially desired direction.

FIG. 8 is an explanatory diagram (front cross-sectional view) illustrating a further explanatory operation state of the indoor unit of the air-conditioning apparatus according to Embodiment 1 of the invention in which the airflow to be blown out from the air outlet is deflected to the right.

For example, as illustrated in FIG. 8, when the airflow to be blown out from the air outlet 3 is deflected to the right (blown to the right), the air volume of the blower fan 4 disposed in the rightmost position (that is, the blower fan 4 disposed on the rightmost side of the vertical vanes 10 corresponding to the deflection direction) is reduced, and the air volumes of the blower fans 4 other than the one disposed in the rightmost position (that is, the blower fan 4 disposed on the rightmost side of the vertical vanes 10 corresponding to the deflection direction) are increased. With this operation method as well, the air volume of the airflow, whose direction has been altered to the front direction by being impinged to the right side wall 1a of the casing 1, becomes relatively small compared to the airflow flowing in the other position that has been deflected in the desired direction. Thus, when the airflow that has been altered to the front direction merges with the other airflow that has been deflected to the right, the directional component altering the merged airflow to the front direction can be suppressed. Consequently, the direction of the airflow that is blown out from the air outlet 3 can be approximated to the initially desired direction.

Furthermore, an advantage described below can be obtained with the operation method illustrated in FIG. 8. Assuming that the air volume of each of the three blower fans 4 is 3.0 m$^3$/min and the total air volume discharged from the air outlet 3 is 9.0 m$^3$/min, for example, when the airflow that is to be blown out from the air outlet 3 is deflected to the right (blown to the right), the air volume of the blower fan 4 on the right side is reduced to 2.0 m$^3$/min and the air volumes of the remaining blower fans 4 are each increased to 3.5 m$^3$/min. With this, the direction of the airflow that is blown out from the air outlet 3 can be approximated to the initially desired direction without changing the total air volume of 9.0 m$^3$/min.

Figure 9:
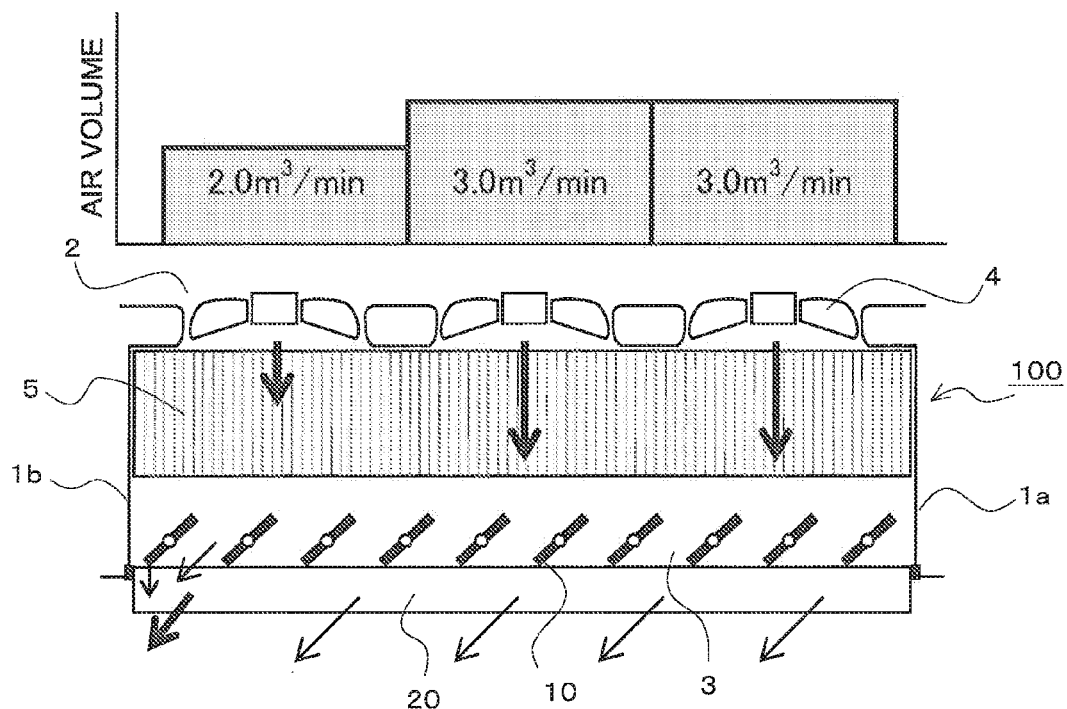
FIG. 9 is an explanatory diagram (front cross-sectional view) illustrating an explanatory operation state of the indoor unit of the air-conditioning apparatus according to Embodiment 1 of the invention in which an airflow to be blown out from an air outlet is deflected to the left.
Figure 10:
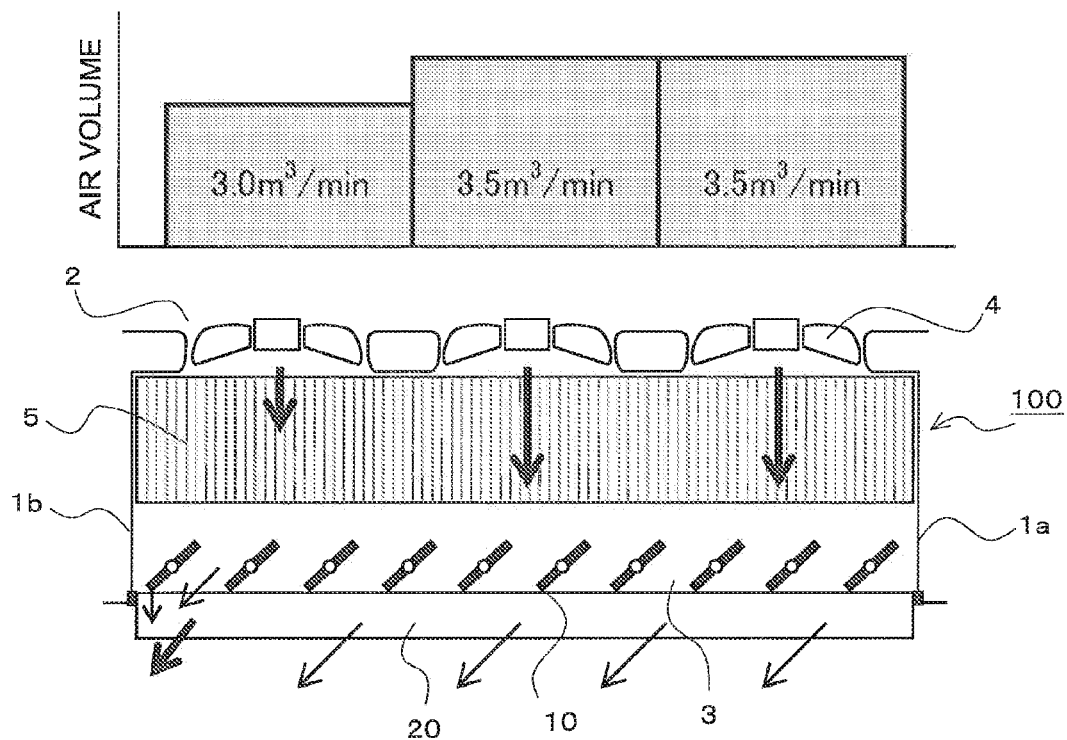
FIG. 10 is an explanatory diagram (front cross-sectional view) illustrating another explanatory operation state of the indoor unit of the air-conditioning apparatus according to Embodiment 1 of the invention in which an airflow to be blown out from an air outlet is deflected to the left.
Figure 11:
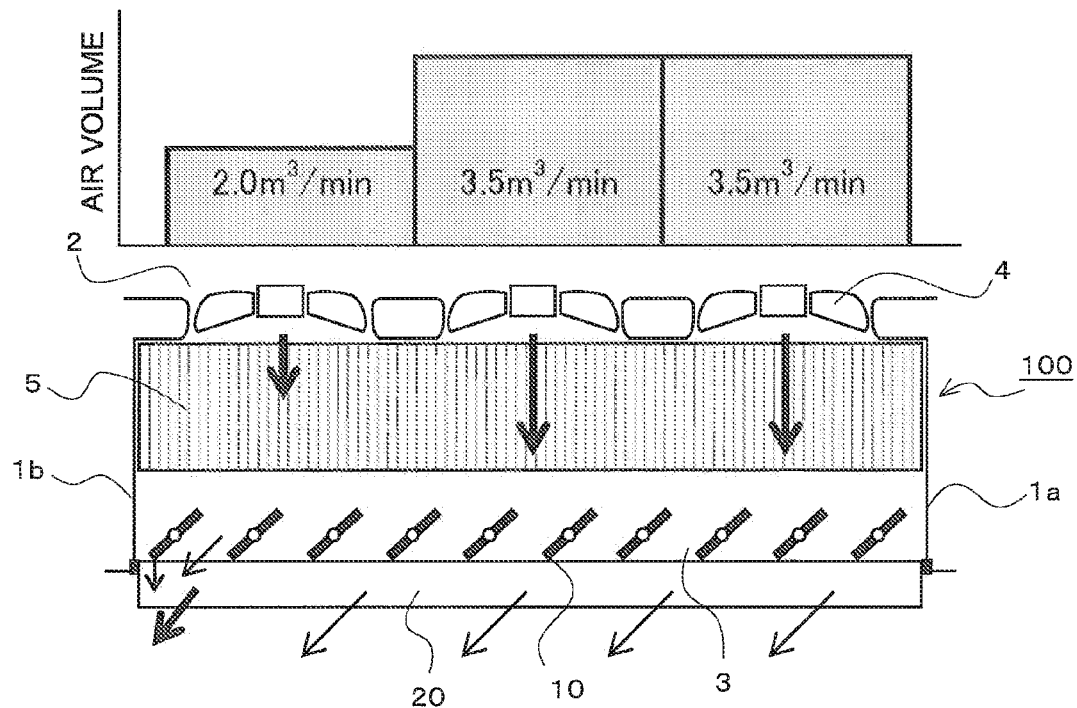
FIG. 11 is an explanatory diagram (front cross-sectional view) illustrating a further explanatory operation state of the indoor unit of the air-conditioning apparatus according to Embodiment 1 of the invention in which an airflow to be blown out from an air outlet is deflected to the left.

Similarly, in the indoor unit 100 according to Embodiment 1 that is provided with a plurality of blower fans 4 adjacent to each other in the left-right direction, when the airflow that is to be blown out from the air outlet 3 is deflected to the left, the air volume of each of the blower fans 4 is controlled, for example, as illustrated in FIGS. 9 to 11.

That is, as illustrated in FIG. 9, for example, when the airflow to be blown out from the air outlet 3 is deflected to the left (blown to the left), the air volume of the blower fan 4 disposed in the leftmost position (that is, the blower fan 4 disposed on the leftmost side of the vertical vanes 10 corresponding to the deflection direction) is reduced.

Further, as illustrated in FIG. 10, for example, when the airflow to be blown out from the air outlet 3 is deflected to the left (blown to the left), the air volumes of the blower fans 4 other than the one disposed in the leftmost position (that is, the blower fan 4 disposed on the leftmost side of the vertical vanes 10 corresponding to the deflection direction) are increased.

Furthermore, as illustrated in FIG. 11, for example, when the airflow to be blown out from the air outlet 3 is deflected to the left (blown to the left), the air volume of the blower fan 4 disposed in the leftmost position (that is, the blower fan 4 disposed on the leftmost side of the vertical vanes 10 corresponding to the deflection direction) is reduced, and the air volumes of the blower fans 4 other than the one disposed in the leftmost position (that is, the blower fan 4 disposed on the leftmost side of the vertical vanes 10 corresponding to the deflection direction) are increased.

Similar to when blowing to the right, when blowing to the left, by controlling the air volume of each blower fan 4 as above, the direction of the airflow that is blown out from the air outlet 3 can be approximated to the initially desired direction. Further, in the operation method illustrated in FIG. 11, an advantage can be obtained in which the direction of the airflow that is blown out from the air outlet 3 can be approximated to the initially desired direction without changing the total air volume.

As above, in the indoor unit 100 of the air-conditioning apparatus configured as in Embodiment 1, the air volume of the blower fan 4 disposed on the leftmost side or the rightmost side of the vertical vanes 10 corresponding to the deflection direction is reduced relative to the air volumes of the blower fans 4 other than the one disposed on the leftmost side or the rightmost side of the vertical vanes 10 corresponding to the deflection direction. Accordingly, the left/right airflow angle (the allowed maximum angle of the airflow in the left/right direction) of the air outlet 3 can be approximated to the initially desired left/right airflow angle, and the left/right airflow angle of the air outlet 3 can be made larger than conventional ones. Since the indoor unit 100 according to Embodiment 1 does not need the vertical vanes 10 to protrude out from the air outlet 3, the indoor unit 100 is capable of preventing the vertical vanes 10 from being easily in contact with the hand of the user and the design from being degraded.

Note that although in Embodiment 1, a case in which three blower fans 4 are provided has been described, the invention can be embodied if two or more blower fans 4 are provided.

Further, the setting methods of the air volume of each of the blower fans 4 described in Embodiment 1 are exemplary and explanatory only. For example, the air volume of each of the blower fans 4 may be set as below.

For example, there are cases in which a vertical vane 10 cannot be disposed in a certain position due to a structural restriction of the indoor unit 100 (for example, the disposed place of the support unit 21 supporting the midway portion of the horizontal vane 20), and the gap between the vertical vanes 10 that are disposed at that position becomes large. In such a case, the air volumes of the blower fans 4 other than the one disposed on the leftmost side or the rightmost side of the vertical vanes 10 corresponding to the deflection direction may be set as FIG. 12, for example.

That is, when the airflow that has flowed out of the heat exchanger 5 is deflected with the vertical vanes 10, the neighboring ends of the vertical vanes need to be near each other in planar view. Ideally, when the airflow that has flowed out of the heat exchanger 5 is deflected with the vertical vanes 10, it is preferable that the neighboring ends of the vertical vanes overlap each other in planar view. However, when a vertical vane 10 cannot be disposed in the substantially middle portion of the air outlet 3, the gap between the neighboring vertical vanes 10 that are disposed in this portion becomes large and, thus, the airflow passing through this portion is directed to a more front direction then that of the desired direction. As a result, the general direction of the airflow that has been blown out from the air outlet 3 (that is, the air direction) disadvantageously becomes one that is altered to the front direction relative to the desired direction due to the airflow passing through this portion.

Figure 12:
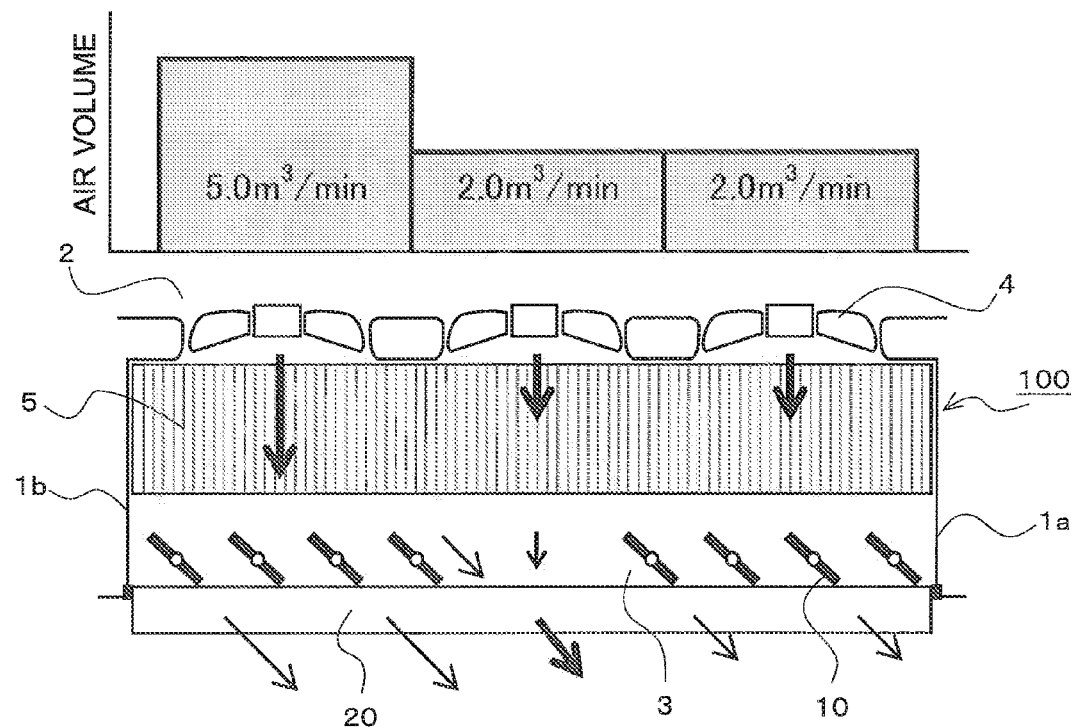
FIG. 12 is an explanatory diagram (front cross-sectional view) illustrating a still another explanatory operation state of the indoor unit of the air-conditioning apparatus according to Embodiment 1 of the invention in which an airflow to be blown out from an air outlet is deflected to the right.

At this time, as illustrated in FIG. 12, in a case in which the airflow to be blown out from the air outlet 3 is deflected to the right, when the air volumes of the blower fans 4 other than the one disposed in the rightmost position (that is, the blower fan 4 disposed on the rightmost side of the vertical vanes 10 corresponding to the deflection direction) are increased, the air volumes of the blower fans 4 other than the one disposed above the gap between the vertical vanes 10 formed with a larger gap than the other gaps (the blower fan 4 disposed in the middle in FIG. 12) may be increased. As such, since the airflow passing through the gap between the vertical vanes 10 formed with a larger gap than the other gaps (that is, the directional component that alters the general direction of the airflow blown out from the air outlet 3 towards the front direction) does not increase, the direction of the airflow that is blown out from the air outlet 3 can be approximated to the initially desired direction. Further, for example, in a case in which the airflow to be blown out from the air outlet 3 is deflected to the right, when the air volumes of the blower fans 4 other than the one disposed in the rightmost position (that is, the blower fan 4 disposed on the rightmost side of the vertical vanes 10 corresponding to the deflection direction) are increased, the air volume of the blower fan 4 disposed above the gap between the vertical vanes 10 formed with a larger gap than the other gaps (the blower fan 4 disposed in the middle in FIG. 12) may be decreased. Since the air volume of the blower fan 4 disposed above the gap between the vertical vanes 10 formed with a larger gap than the other gaps (that is, the directional component that alters the general direction of the airflow blown out from the air outlet 3 towards the front direction) decreases, the direction of the airflow that is blown out from the air outlet 3 can be approximated to the initially desired direction.

Needless to say, the air volumes of the blower fans 4 other than the one disposed above the gap between the vertical vanes 10 formed with a larger gap than the other gaps may be increased and the air volume of the blower fan 4 disposed above the gap between the vertical vanes 10 formed with a larger gap than the other gaps may be reduced.

Furthermore, for example, there are cases in which a structure, such as the support unit 21 supporting the midway portion of the horizontal vane 20, occupies the space of the air outlet 3. In such a case, the air volumes of the blower fans 4 other than the one disposed on the leftmost side or the rightmost side of the vertical vanes 10 corresponding to the deflection direction may be set as FIG. 13, for example.

When there is a structure that occupies the space of the air outlet 3, the airflow flowing through the air outlet 3 (the airflow that has been deflected by the vertical vanes 10 or the airflow that is flowing into the vertical vanes 10) is impeded. Accordingly, there are cases in which the aerodynamic performance of the indoor unit 100 drops or in which noise of the indoor unit 100 increases.

Figure 13:
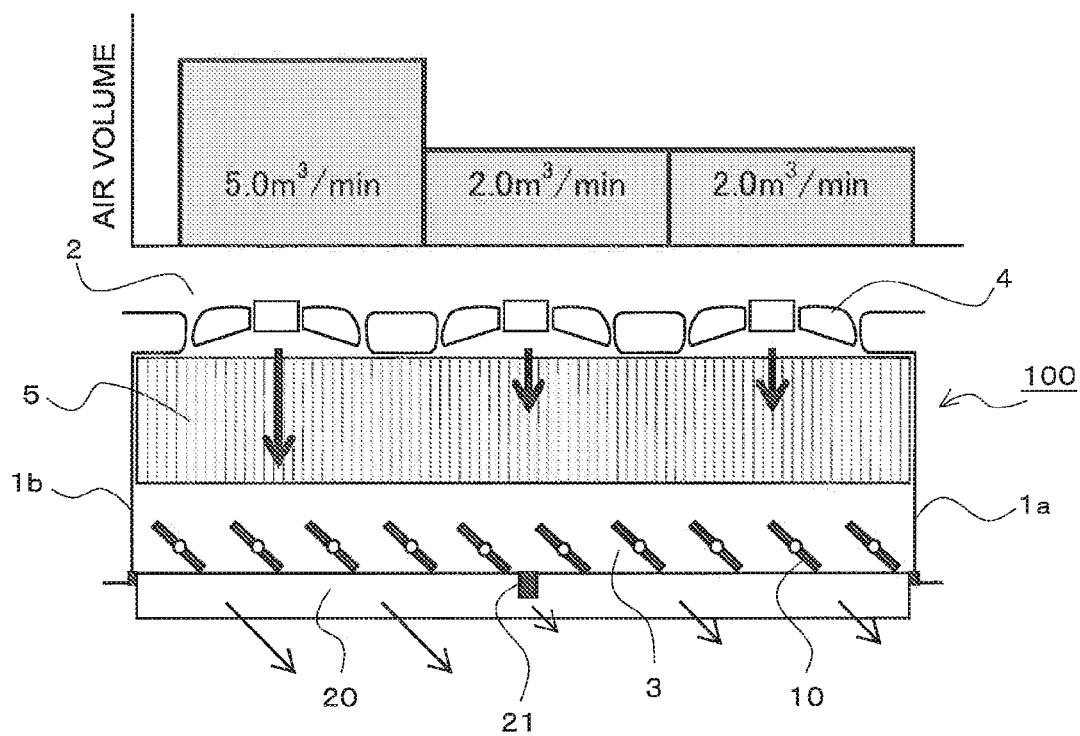
FIG. 13 is an explanatory diagram (front cross-sectional view) illustrating a yet another explanatory operation state of the indoor unit of the air-conditioning apparatus according to Embodiment 1 of the invention in which an airflow to be blown out from an air outlet is deflected to the right.

At this time, as illustrated in FIG. 13, in a case in which the airflow to be blown out from the air outlet 3 is deflected to the right, when the air volumes of the blower fans 4 other than the one disposed in the rightmost position (that is, the blower fan 4 disposed on the rightmost side of the vertical vanes 10 corresponding to the deflection direction) are increased, the air volumes of the blower fans 4 other than the one disposed above the structure occupying the space of the air outlet 3 (the blower fan 4 disposed in the middle in FIG. 13) may be increased. As such, since the airflow impeded by the structure does not increase, the direction of the airflow that is blown out from the air outlet 3 can be approximated to the initially desired direction, as well as preventing drop of aerodynamic performance and increase of noise of the indoor unit 100. Further, for example, in a case in which the airflow to be blown out from the air outlet 3 is deflected to the right, when the air volumes of the blower fans 4 other than the one disposed in the rightmost position (that is, the blower fan 4 disposed on the rightmost side of the vertical vanes 10 corresponding to the deflection direction) are increased, the air volume of the blower fan 4 disposed above the structure occupying the space of the air outlet 3 (the blower fan 4 disposed in the middle in FIG. 12) may be reduced. Since the air volume of the airflow impeded by the structure is reduced, the direction of the airflow that is blown out from the air outlet 3 can be approximated to the initially desired direction, as well as preventing drop of aerodynamic performance and increase of noise of the indoor unit 100.

Needless to say, the air volumes of the blower fans 4 other than the one disposed above the structure occupying the space of the air outlet 3 may be increased and the air volume of the blower fan 4 disposed above the structure occupying the space of the air outlet 3 may be reduced.

Figure 14:
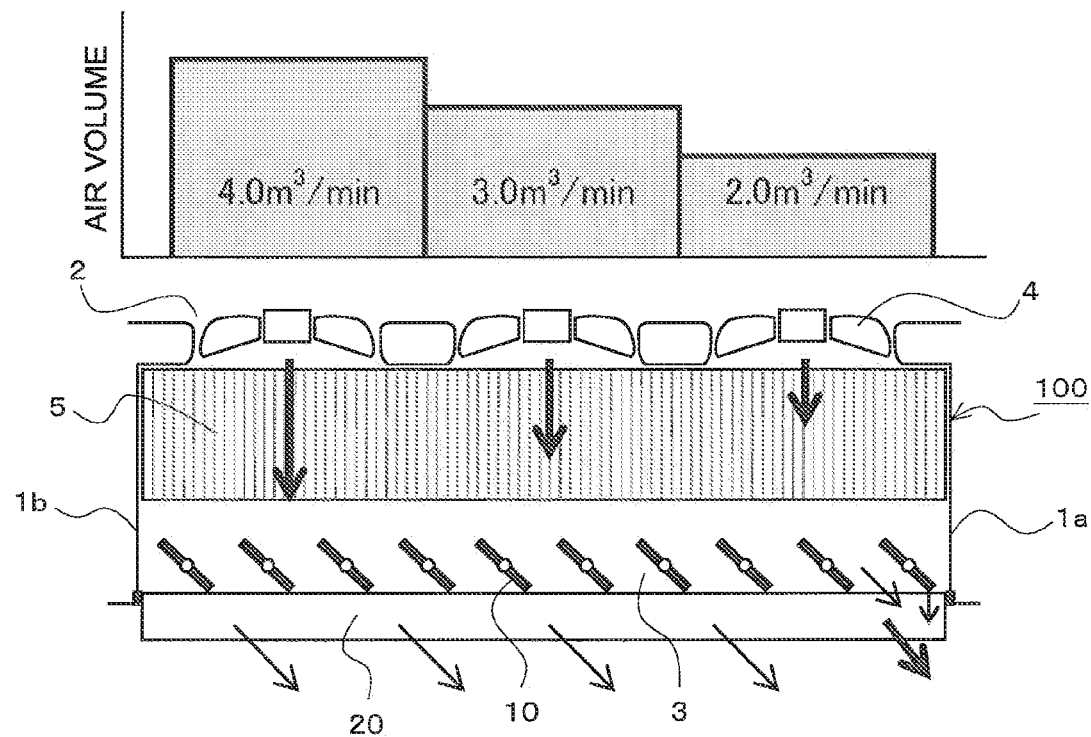
FIG. 14 is an explanatory diagram (front cross-sectional view) illustrating a still yet another explanatory operation state of the indoor unit of the air-conditioning apparatus according to Embodiment 1 of the invention in which an airflow to be blown out from an air outlet is deflected to the right.

Further, for example, depending on the outer diameters of the blower fans 4 or the pitch between the blower fans 4, there are cases in which the distribution of the airflow blown out from the air outlet 3 becomes nonuniform when the air volume of a blower fan 4 is extremely reduced while the air volume of the neighboring blower fan 4 is extremely increased. In such a case, the air volume of each of the blower fans 4 may be set as FIG. 14, for example. That is, the air volumes of the plurality of blower fans 4 are progressively increased from the blower fan 4 on the leftmost side or the rightmost side of the vertical vanes 10 corresponding to the deflection direction to the one on the opposite side of the deflection direction. By controlling the air volume of each of the blower fans 4 as such, the direction of the airflow that is blown out from the air outlet 3 can be approximated to the initially desired direction, as well as preventing the distribution of the airflow blown out from the air outlet 3 to become nonuniform.

Figure 15:
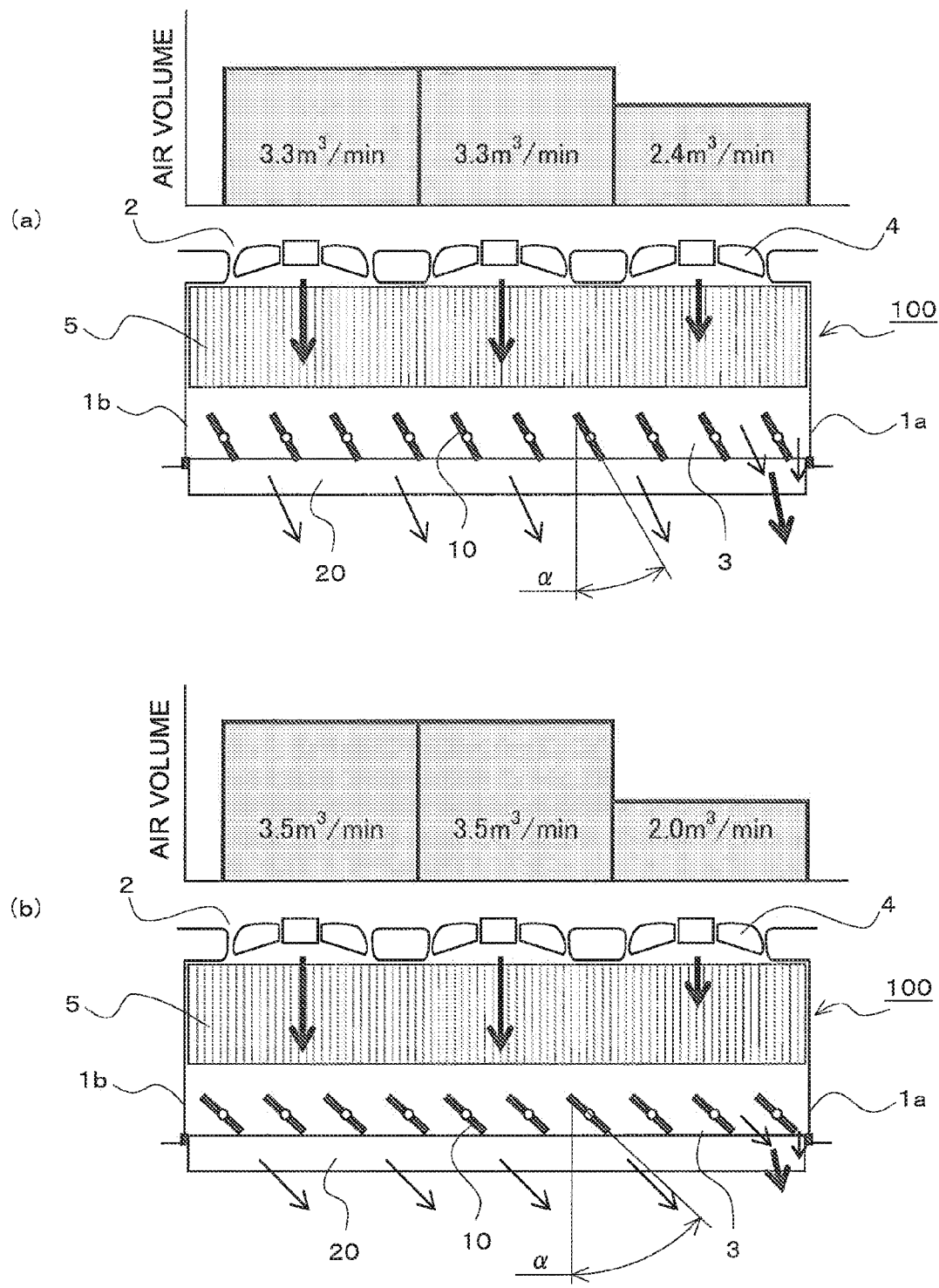
FIG. 15 is an explanatory diagram (front cross-sectional view) illustrating further still, yet another explanatory operation state of the indoor unit of the air-conditioning apparatus according to Embodiment 1 of the invention in which an airflow to be blown out from an air outlet is deflected to the right.

Further, for example, as illustrated in FIG. 15, the difference between "the air volume of the blower fan 4 disposed on the leftmost side or the rightmost side of the vertical vanes 10 corresponding to the deflection direction" and "the air volumes of the blower fans 4 other than the one disposed on the leftmost side or the rightmost side of the vertical vanes 10 corresponding to the deflection direction" may be changed depending on the deflection angle of the vertical vanes 10 (that is, the pivot angle α of the vertical vanes 10). That is, the difference between "the air volume of the blower fan 4 disposed on the leftmost side or the rightmost side of the vertical vanes 10 corresponding to the deflection direction" and the "the air volumes of the blower fans 4 other than the one disposed on the leftmost side or the rightmost side of the vertical vanes 10 corresponding to the deflection direction" may be increased as the deflection angle of the vertical vanes 10 (that is, the pivot angle α of the vertical vanes 10) becomes larger. For example, when the difference between "the air volume of the blower fan 4 disposed on the leftmost side or the rightmost side of the vertical vanes 10 corresponding to the deflection direction" and the "the air volumes of the blower fans 4 other than the one disposed on the leftmost side or the rightmost side of the vertical vanes 10 corresponding to the deflection direction" are the same, the larger the deflection angle of the vertical vanes 10 (that is, the pivot angle α of the vertical vanes 10) becomes, the larger the air volume impinging to the casing (that is, the directional component that alters the general direction of the airflow blown out from the air outlet 3 towards the front direction) becomes. For example, when the difference between "the air volume of the blower fan 4 disposed on the leftmost side or the rightmost side of the vertical vanes 10 corresponding to the deflection direction" and the "the air volumes of the blower fans 4 other than the one disposed on the leftmost side or the rightmost side of the vertical vanes 10 corresponding to the deflection direction" are the same, the larger the deflection angle of the vertical vanes 10 (that is, the pivot angle α of the vertical vanes 10) becomes, the airflow blown out from the air outlet 3 becomes more likely to be deviated from the desired direction. At this time, by changing the air volume of each of the blower fans 4 as illustrated in FIG. 15, it is possible to perform linear change of the general direction of the airflow blown out from the air outlet 3 when changing the airflow blown out from the air outlet 3 from a forward direction blowing state to a left/right direction blowing state.

Figure 16:
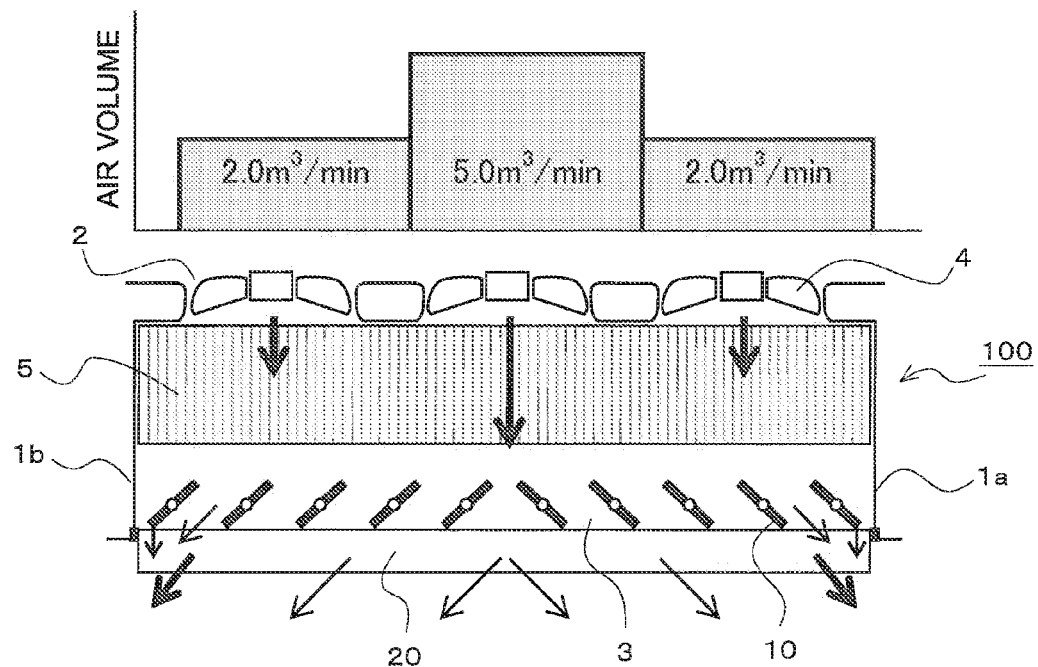
FIG. 16 is an explanatory diagram (front cross-sectional view) illustrating further still, still yet another explanatory operation state of the indoor unit of the air-conditioning apparatus according to Embodiment 1 of the invention in which an airflow to be blown out from an air outlet is deflected to the right.

Further, in Embodiment 1, although examples in which each vertical vanes 10 oscillate in the same direction have been described, the vertical vanes 10 may be made to oscillate in a manner as illustrated in FIG. 16, for example. That is, in the indoor unit 100 illustrated in FIG. 16, a group of vertical vanes 10 disposed on the left side oscillates to the left thus generating an airflow blown out to the left. Whereas, a group of vertical vanes 10 disposed on the right side oscillates to the right thus generating airflow blown out to the right. In such an indoor unit 100 configured as such, the air volume of the blower fans 4 each disposed on the leftmost side or the rightmost side of the corresponding group of the vertical vanes 10 corresponding to the deflection direction (the blower fan 4 on the left corresponding to the group of vertical vanes 10 on the left side, and the blower fan 4 on the right corresponding to the group of vertical vanes 10 on the right side) may be made relatively small compared to the air volume of the blower fan 4 (the middle blower fan 4 in FIG. 16) other than the blower fans 4 each disposed on the leftmost side or the rightmost side of the corresponding group of the vertical vanes 10 corresponding to the deflection direction. As such, the left/right airflow angle of the air outlet can be made wider than conventional ones while preventing the vertical vanes 10 from being easily in contact with the hand of the user and the design from being degraded.

Figure 17:
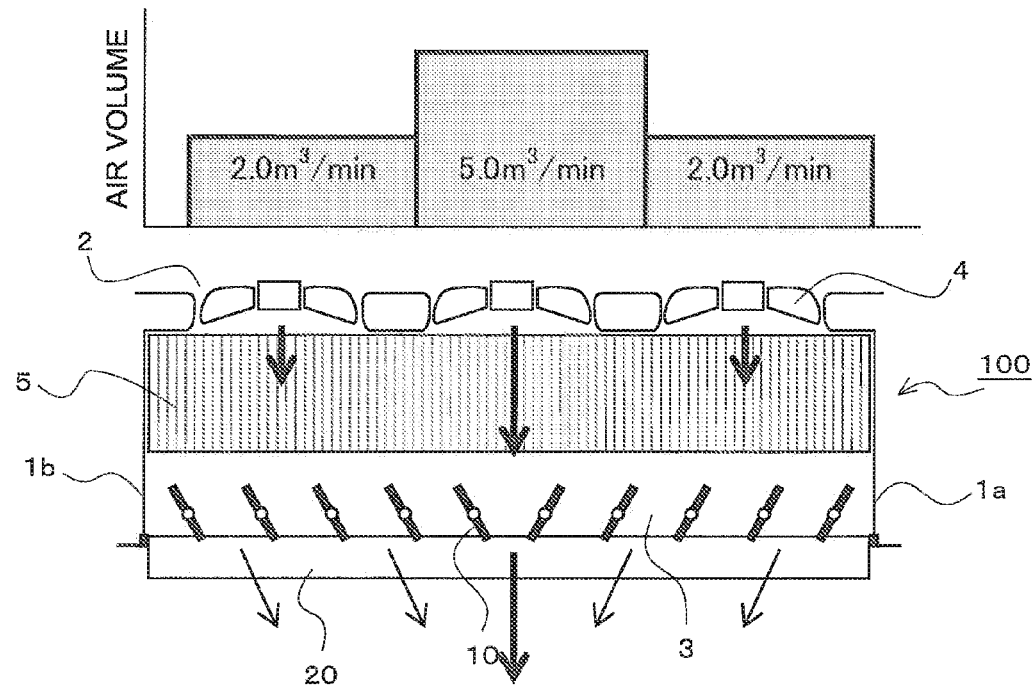
FIG. 17 is an explanatory diagram (front cross-sectional view) illustrating further still, still yet another explanatory operation state of the indoor unit of the air-conditioning apparatus according to Embodiment 1 of the invention in which an airflow to be blown out from an air outlet is deflected to the right.

Note that in such an indoor unit 100 whose airflows blown out from the air outlet 3 are each different between the groups of a plurality of vertical vanes 10, an advantage such as the one in FIG. 17 may be obtained by differentiating the air volume of each blower fan 4. That is, in the indoor unit 100 illustrated in FIG. 17, a group of vertical vanes 10 disposed on the left side oscillates to the right thus generating an airflow blown out to the right. Whereas, a group of vertical vanes 10 disposed on the right side oscillates to the left thus generating airflow blown out to the left. By controlling the oscillating direction of each group of the vertical vanes 10 as such, it will be possible to supply a converged airflow to be blown out from the air outlet 3. At this time, there is a concern that the airflow becomes a cause of loss and noise due to impingement of the airflows that has passed through the vertical vanes 10. However, as illustrated in FIG. 17, by reducing the air volume of each of the blower fans 4 at opposite ends and increasing the air volume of the blower fan 4 in the middle, and further by setting the angle of the vertical vanes 10 more to the front side, loss and noise can be reduced and stable airflow can be supplied.

Figure 18:
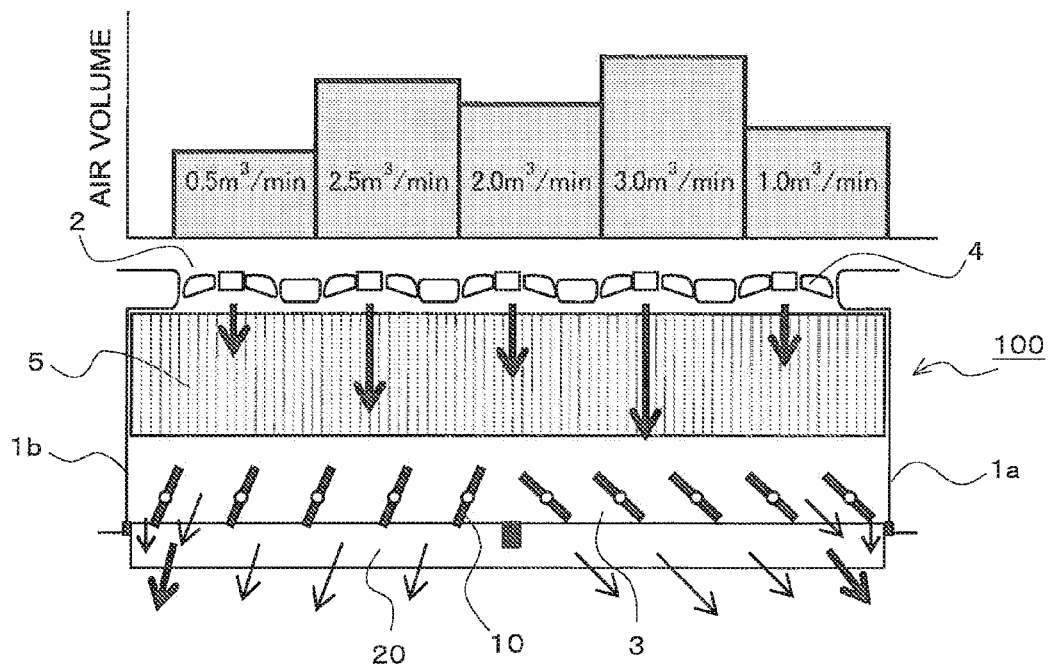
FIG. 18 is an explanatory diagram (front cross-sectional view) illustrating further still, still yet another explanatory operation state of the indoor unit of the air-conditioning apparatus according to Embodiment 1 of the invention in which an to be airflow blown out from an air outlet is deflected to the right.

Further, in the indoor unit 100 having groups of the plurality of vertical vanes 10 in which each group blows out different airflows from the air outlet 3 as illustrated in FIG. 16, in a case in which there is a plurality of blower fans 4 other than the blower fans 4 each disposed on the leftmost side or the rightmost side of the corresponding group to of the vertical vanes 10 corresponding to the deflection direction, needless to say, the air volume of each blower fan 4 may differ as illustrated in FIGS. 5 to 15. For example, as illustrated in FIG. 18, the air volume of the blower fans 4 each disposed on the leftmost side or the rightmost side of the corresponding group of the vertical vanes 10 corresponding to the deflection direction (the blower fan 4 on the left corresponding to the group of vertical vanes 10 on the left side, and the blower fan 4 on the right corresponding to the group of vertical vanes 10 on the right side) may be made relatively small compared to the air volumes of the blower fans 4 other than the blower fans 4 each disposed on the leftmost side or the rightmost side of the corresponding group of the vertical vanes 10 corresponding to the deflection direction. Among the blower fans 4 other than the blower fans 4 each disposed on the leftmost side or the rightmost side of the corresponding group of the vertical vanes 10 corresponding to the deflection direction, the air volumes of the blower fans 4 other than the blower fan 4 above the support unit 21 (the structure occupying the space of the air outlet 3) supporting the midway portion of the horizontal vane 20 may be increased. Further, the difference between "the air volume of the blower fans 4 each disposed on the leftmost or the rightmost side of the corresponding group of the vertical vanes 10 corresponding to the deflection direction" and "the air volumes of the blower fans 4 other than the blower fans 4 each disposed on the leftmost or the rightmost side of the corresponding group of the vertical vanes 10 corresponding to the deflection direction" may be changed depending on the deflection angle of the vertical vanes 10 (that is, the pivot angle α of the vertical vanes 10).

Note that in the above description, whether to change the airflow blown out from the air outlet 3 relative to time is not mentioned; however, the airflow blown out from the air outlet 3 may be fixed (that is, the airflow blown out from the air outlet 3 may not be changed relative to time) or, it goes without saying, the airflow blown out from the air outlet 3 may be changed along with the elapse of time (a swing operation, so to speak). It is possible to perform linear change of the airflow blown out from the air outlet 3 by changing the difference between "the air volume of the blower fan 4 disposed on the leftmost side or the rightmost side of the vertical vanes 10 corresponding to the deflection direction" and "the air volumes of the blower fans 4 other than the one disposed on the leftmost side or the rightmost side of the vertical vanes 10 corresponding to the deflection direction" depending on the deflection angle of the vertical vanes 10 (that is, the pivot angle α of the vertical vanes 10) when the airflow blown out from the air outlet 3 is changed along with the elapse of time.

Embodiment 2

As illustrated in Embodiment 1, the indoor unit of the air-conditioning apparatus according to the invention disposes the blower fans above the heat exchanger. That is, a space is formed below the heat exchanger where, in the indoor unit of the known air-conditioning apparatus, a blower fan (a cross flow fan, for example) is disposed. Accordingly, the vertical vanes 10 may be configured to have a below-described shape by utilizing the space. It should be noted that, in Embodiment 2, items not specifically described are the same as those of Embodiment 1, and like functions and configurations are denoted by like reference signs.

Figure 19:
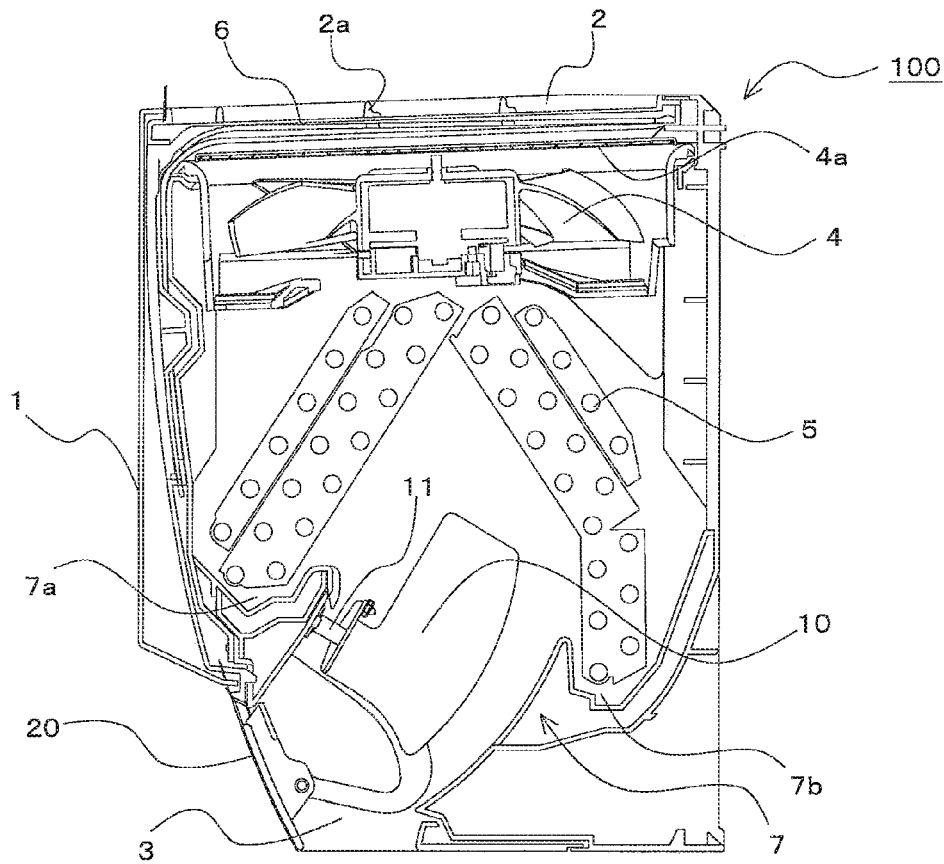
FIG. 19 is a side cross-sectional view of an indoor unit of an air-conditioning apparatus according to Embodiment 2 of the invention.
Figure 20:
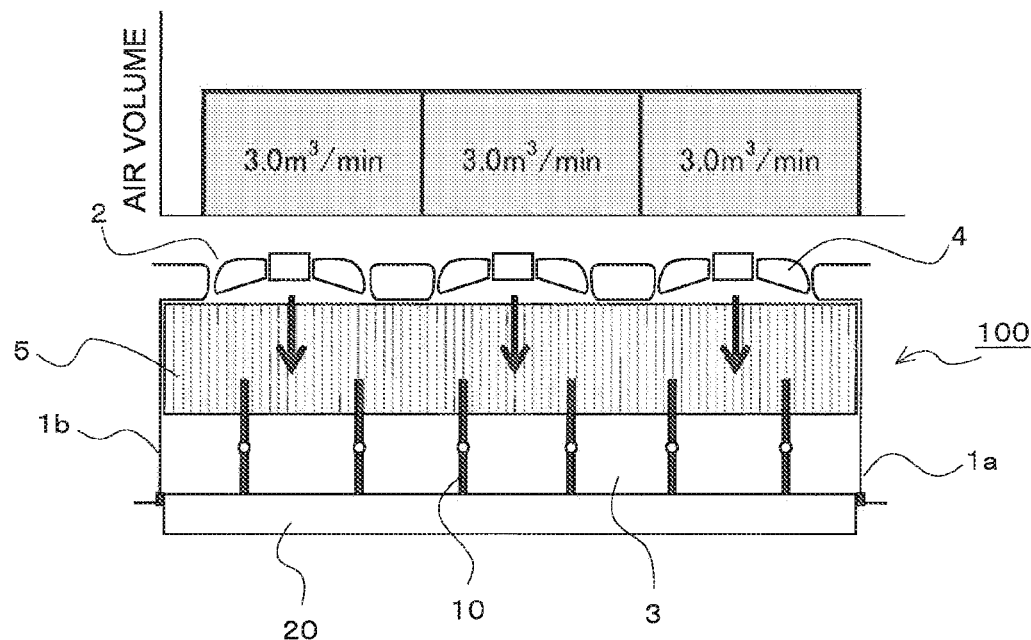
FIG. 20 is an explanatory diagram (front cross-sectional view) illustrating an explanatory operation state of the indoor unit of the air-conditioning apparatus according to Embodiment 2 of the invention in which an airflow to be blown out from an air outlet is directed to the front side.
Figure 21:
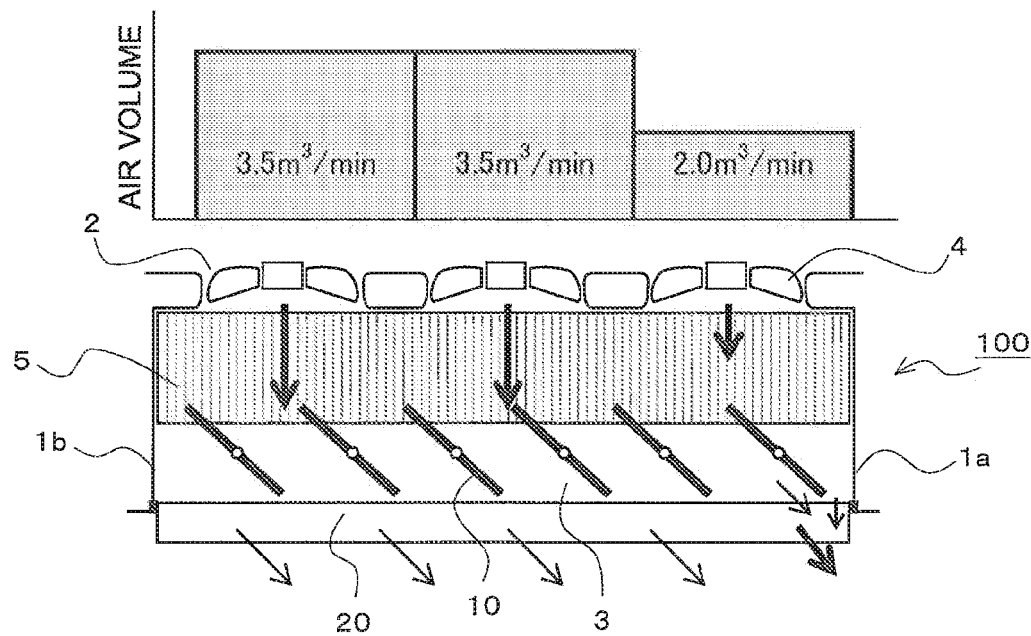
FIG. 21 is an explanatory diagram (front cross-sectional view) illustrating an explanatory operation state of the indoor unit of the air-conditioning apparatus according to Embodiment 2 of the invention in which an airflow to be blown out from an air outlet is deflected to the right.

FIG. 19 is a side cross-sectional view of an indoor unit of an air-conditioning apparatus according to Embodiment 2 of the invention. FIG. 20 is an explanatory diagram (front cross-sectional view) illustrating an explanatory operation state of the indoor unit of the air-conditioning apparatus according to Embodiment 2 of the invention in which the airflow to be blown out from the air outlet is directed to the front side. FIG. 21 is an explanatory diagram (front cross-sectional view) illustrating an explanatory operation state of the indoor unit of the air-conditioning apparatus according to Embodiment 2 of the invention in which the airflow to be blown out from the air outlet is deflected to the right.

In the indoor unit 100 according to Embodiment 2, the upper ends of the vertical vanes 10 are extended into a space surrounded by the heat exchanger 5 that is formed into a substantially inverted V-shape in a cross sectional view. That is, each vertical vane 10 according to Embodiment 2 has a longer length in the direction of the airflow flowing through the air outlet 3 (hereinafter, referred to as "airflow direction length") compared with the airflow direction length of the vertical vanes 10 illustrated in Embodiment 1. As mentioned above, when the airflow that has flowed out of the heat exchanger 5 is deflected with the vertical vanes 10, the neighboring ends of the vertical vanes need to be near each other in planar view. Accordingly, in Embodiment 2, since the airflow direction length of the vertical vanes 10 are longer than the airflow direction length of the vertical vanes 10 illustrated in Embodiment 1, the number of vertical vanes 10 disposed in the air outlet 3 can be reduced (see FIG. 20).

As above, in the indoor unit 100 of the air-conditioning apparatus configured as in Embodiment 2, similar to Embodiment 1, the air volume of the blower fan 4 disposed on the leftmost side or the rightmost side of the vertical vanes 10 corresponding to the deflection direction is reduced relative to the air volumes of the blower fans 4 other than the one disposed on the leftmost side or the rightmost side of the vertical vanes 10 corresponding to the deflection direction (see FIG. 21). Accordingly, similar to Embodiment 1, the left/right airflow angle (the allowed maximum angle of the airflow in the left/right direction) of the air outlet 3 can be approximated to the initially desired left/right airflow angle, and the left/right airflow angle of the air outlet 3 can be made larger than conventional ones. Similar to Embodiment 1, since the indoor unit 100 according to Embodiment 2 does not need the vertical vanes 10 to protrude out from the air outlet 3, the indoor unit 100 is capable of preventing the vertical vanes 10 from being easily in contact with the hand of the user and the design from being degraded.

Further, in the indoor unit 100 of the air-conditioning apparatus according to Embodiment 2, since the number of vertical vanes 10 can be reduced, compared to the indoor unit 100 illustrated in Embodiment 1, impeding of the airflow passing through the air outlet 3 by the vertical vanes 10 can be suppressed. Accordingly, the indoor unit 100 of the air-conditioning apparatus according to Embodiment 2 can further suppress drop of aerodynamic performance of the indoor unit 100 and further suppress increase in noise of the indoor unit 100, compared to the indoor unit 100 illustrated in Embodiment 1.

Note that in Embodiment 2, an example in which the heat exchanger 5 is formed of a substantially inverted V-shape in a cross sectional view has been described, the shape of the heat exchanger 5 is not limited to this. The shape of the heat exchanger 5 may be any that has a concave shape in the lower portion in a cross sectional view, such as an N-shape or an M-shape in a cross sectional view. That is, as long as the heat exchanger 5 is shaped so as to have a concave shape in the lower portion in a cross sectional view, the upper end of the vertical vanes 10 can be extended and the advantage described in Embodiment 2 can be obtained.

REFERENCE SIGNS LIST 1 casing; 1a right side wall; 1b left side wall; 2 air inlet; 2a bar; 3 air outlet; 4 blower fan; 4a fan guard; 5 heat exchanger; 6 filter; 7 drain pan; 7a front side drain pan; 7b rear side drain pan; 10 vertical vane; 11 support shaft; 12 connecting rod; 20 horizontal vane; 20*a* first horizontal vane; 20*b* second horizontal vane; 21 support unit; 100 indoor unit.

I claim:

1. An indoor unit of an air-conditioning apparatus, comprising:
   a casing being formed with an air inlet in an upper portion of the casing and with an air outlet on a lower front side of the casing;
   a plurality of blower fans, each of which is a propeller type or a mixed flow type, being provided on a downstream side of the air inlet so as to be adjacent to each other along a left-right direction of the casing;
   a heat exchanger being provided on a downstream side of the blower fans and on an upstream side of the air outlet, the heat exchanger exchanging heat between air that has been blown out from the blower fans and a refrigerant; and
   a plurality of vertical vanes being oscillatably provided in the air outlet in the left-right direction, the vertical vanes deflecting airflow to be blown out from the air outlet in a left/right direction,
   wherein
   at time of deflecting the airflow to be blown out from the air outlet with the vertical vanes in at least one direction in the left/right direction,
   an air volume of a blower fan of the blower fans disposed on a leftmost side or a rightmost side of the vertical vanes corresponding to the deflection direction and an air volume of blower fans other than the blower fan disposed on the leftmost side or the rightmost side are controlled so that the air volume of the blower fan of the blower fans disposed on the leftmost side or the rightmost side of the vertical vanes corresponding to the deflection direction is reduced relative to the air volume of the blower fan other than the blower fan disposed on the leftmost side or the rightmost side,
   an air volume of at least one blower fan other than the blower fan disposed on the leftmost side or the rightmost side of the vertical vanes corresponding to the deflection direction is increased, and
   the air volume of the blower fan disposed on the leftmost side or the rightmost side of the vertical vanes corresponding to the deflection direction is reduced to a non-zero value.

2. The indoor unit of an air-conditioning apparatus of claim 1, wherein
   at time of deflecting the airflow to be blown out from the air outlet with the vertical vanes in at least one direction in the left/right direction,
   the air volume of the blower fan disposed on the leftmost side or the rightmost side of the vertical vanes corresponding to the deflection direction is reduced.

3. The indoor unit of an air-conditioning apparatus of claim 1, wherein
   the vertical vanes are provided adjacent to each other in the left-right direction with a predetermined gap between each other,
   one or some of the gaps is formed to be larger than the other gaps,
   at time of deflecting the airflow to be blown out from the air outlet with the vertical vanes in at least one direction in the left/right direction,
   an air volume of a blower fan of the blower fans disposed above the gap formed to be larger is reduced.

4. The indoor unit of an air-conditioning apparatus of claim 1, wherein
   the vertical vanes are provided adjacent to each other in the left-right direction with a predetermined gap between each other,
   one of the gaps is formed to be larger than the other gaps
   at time of deflecting the airflow to be blown out from the air outlet with the vertical vanes in at least one direction in the left/right direction,
   among the blower fans other than the blower fan disposed on the leftmost side or the rightmost side of the vertical vanes corresponding to the deflection direction, an air volume of at least one blower fan other than the blower fan disposed above the gap formed to be larger is increased.

5. The indoor unit of an air-conditioning apparatus of claim 1, further comprising
   a horizontal vane extending in the air outlet in the left-right direction, the horizontal vane deflecting the airflow to be blown out from the air outlet in an up/down direction, and
   a support unit supporting the horizontal vane so as to be oscillatable in the up/down direction at a midway portion of the horizontal vane,
   wherein
   at time of deflecting the airflow to be blown out from the air outlet with the vertical vanes in at least one direction in the left/right direction,
   an air volume of a blower fan of the blower fans disposed above the support unit is reduced.

6. The indoor unit of an air-conditioning apparatus of claim 1, further comprising
   a horizontal vane extending in the air outlet in the left-right direction, the horizontal vane deflecting the airflow to be blown out from the air outlet in an up/down direction, and
   a support unit supporting the horizontal vane so as to be oscillatable in the up/down direction at a midway portion of the horizontal vane,
   wherein
   at time of deflecting the airflow to be blown out from the air outlet with the vertical vanes in at least one direction in the left/right direction,
   among the blower fans other than the blower fan disposed on the leftmost side or the rightmost side of the vertical vanes corresponding to the deflection direction, an air volume of at least one blower fan other than the blower fan disposed above the support unit is increased.

7. The indoor unit of an air-conditioning apparatus of claim 1, wherein
   three or more the blower fans are provided, and
   at time of deflecting the airflow to be blown out from the air outlet with the vertical vanes in at least one direction in the left/right direction,
   the air volumes of the three or more blower fans are progressively increased from the blower fan on the side in the deflection direction of the vertical vanes to the blower fan on the opposite side of the deflection direction.

8. The indoor unit of an air-conditioning apparatus of claim 1, wherein
   at time of deflecting the airflow to be blown out from the air outlet with the vertical vanes in at least one direction in the left/right direction,
   depending on a deflection angle of the vertical vanes,
   the difference between the air volume of the blower fan disposed on the leftmost side or the rightmost side of the vertical vanes corresponding to the deflection direction and an air volume of a blower fan other than the blower fan disposed on the leftmost side or the rightmost side is changed.

9. The indoor unit of an air-conditioning apparatus of claim 1, wherein amount of deflection of the vertical vanes is changed along with elapse of time.

10. The indoor unit of an air-conditioning apparatus of claim 1, wherein the heat exchanger has a concave shape in the lower portion in a cross sectional view, and
    upper ends of the vertical vanes are extended into a space formed by the concave shape.

11. The indoor unit of an air-conditioning apparatus of claim 1, wherein
    the air volume of the blower fan of the blower fans disposed on the leftmost side or the rightmost side of the vertical vanes corresponding to the deflection direction is a positive air volume, and
    the air volume of the blower fans other than the blower fan disposed on the leftmost side or the rightmost side is a positive air volume.

* * * * *